United States Patent
Satapathy

(10) Patent No.: US 7,437,157 B1
(45) Date of Patent: Oct. 14, 2008

(54) METHOD AND SYSTEM FOR WIRELESS ADMISSION CONTROL BASED ON FIXED OR MOBILE NATURE OF WIRELESS COMMUNICATION DEVICES

(75) Inventor: Durga P. Satapathy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 99 days.

(21) Appl. No.: 10/860,085

(22) Filed: Jun. 2, 2004

(51) Int. Cl.
*H04Q 7/20* (2006.01)

(52) U.S. Cl. ............... 455/435; 455/452; 455/453; 455/512; 455/456.6; 455/68

(58) Field of Classification Search ............. 455/453, 455/452, 435, 68, 456.6, 512
See application file for complete search history.

(56) References Cited

U.S. PATENT DOCUMENTS

| | | | |
|---|---|---|---|
| 5,740,537 A * | 4/1998 | Beming et al. | 455/450 |
| 5,790,955 A | 8/1998 | Tomoike | |
| 5,850,604 A * | 12/1998 | Dufour et al. | 455/435.1 |
| 6,226,277 B1 | 5/2001 | Chuah | |
| 6,240,287 B1 | 5/2001 | Cheng et al. | |
| 6,314,293 B1 * | 11/2001 | Servi et al. | 455/450 |
| 6,477,150 B1 | 11/2002 | Maggenti et al. | |
| 6,618,597 B1 | 9/2003 | Choi | |
| 2002/0024943 A1 | 2/2002 | Karaul et al. | |
| 2002/0102986 A1* | 8/2002 | Iwamura et al. | 455/453 |
| 2003/0087653 A1 | 5/2003 | Leung et al. | |

* cited by examiner

*Primary Examiner*—Joseph Feild
*Assistant Examiner*—Pierre-Louis Desir

(57) ABSTRACT

A method and system for wireless admission control. The system monitors the air interface load in various wireless coverage areas, such as sectors for instance. When the load exceeds a designated level, the system begins making call admission decisions based on whether the calls involve mobile wireless devices (such as handheld cell phones) or fixed wireless devices (such as wall-mounted cell phones or wireless local loop hubs). Further, the system may additionally base its admission decisions on the type of bearer traffic carried by the calls, such as whether the calls carry voice, fax or data traffic.

21 Claims, 5 Drawing Sheets

METHOD AND SYSTEM FOR WIRELESS ADMISSION CONTROL BASED ON FIXED OR MOBILE NATURE OF WIRELESS COMMUNICATION DEVICES

BACKGROUND OF THE INVENTION

1. Field of the Invention

The present invention relates to wireless communications and, more particularly, to distribution of call load among coverage areas in a cellular wireless communication system.

2. Description of Related Art

In a typical cellular wireless communication system, an area is divided geographically into a number of cell sites, each defined by a radio frequency (RF) radiation pattern from a respective base transceiver station (BTS) antenna. The base station antennae in the cells are in turn coupled with a base station controller (BSC), which is then coupled with a switch or gateway that provides connectivity with a transport network such as the public switched telephone network (PSTN) or the Internet. For instance, the BSC may be coupled with a mobile switching center (MSC) that provides connectivity with the PSTN and/or the BSC may be coupled with a packet gateway, such as a packet data serving node (PDSN) or media gateway (MG), that provides connectivity with the Internet.

When a wireless communication device (WCD), such as a cellular telephone, pager, or wirelessly-equipped computer) is positioned in a cell, the WCD communicates via an RF air interface with the BTS antennae of a cell. Consequently, a communication path can be established between the WCD and the transport network, via the air interface, the BTS, the BSC and the switch or gateway.

With the explosive growth in demand for wireless communications, the level of call traffic in most cell sites has increased drastically over recent years. To help manage the call traffic, most cells in a wireless network are usually further divided into a number of sectors or other coverage areas, each defined respectively by radiation patterns from directional antenna components of the respective BTS, or by respective BTS antennae.

Further, in most wireless communication systems, multiple BTSs are connected with a common BSC, and multiple BSCs are connected with a common switch or gateway. Each BSC may then manage air interface resources for multiple wireless coverage areas (e.g., multiple cells and sectors), by performing functions such as assigning air interface traffic channels for use by WCDs in the coverage areas, controlling the power levels used for air interface communications, and orchestrating handoff of calls between coverage areas. And the switch and/or gateway, in turn, may control one or more BSCs and generally control wireless communications, by performing functions such receiving and processing call requests, instructing BSCs when to assign traffic channels, paging WCDs, and managing handoff of calls between BSCs.

The combination of network entities that provides a connection between WCDs and transport networks is considered a "radio access network" (RAN). In the arrangement described above, for instance, a RAN may include one or more BTSs, one or more BSCs, and an MSC. Of course, those skilled in the art will appreciate that these RAN entities are functional in nature and can therefore be combined or distributed in various ways. For example, BTS and BSC functions can be integrated together, and BSC and MSC functions can be integrated together. Further, a RAN can include other entities or take other forms altogether.

When a typical WCD powers on or otherwise enters the coverage of a given RAN, the WCD may register with the RAN and may then place and receive calls via the RAN. For instance, depending on the arrangement of the WCD, it may be able to place or receive voice calls, fax calls, and/or data calls (e.g., packet-data sessions) via the RAN. (Other WCDs may have more restricted functionality, such as being able to place but not receive calls, or vice versa.)

To initiate a call, when operating in a given sector or other coverage area of the RAN, for instance, the WCD may send an origination request into the RAN via an air interface access channel defined in the WCD's current sector. In response, the RAN may then assign an air interface traffic channel to be used for the call in the WCD's current sector, and the RAN may work to set up the call for the WCD. Upon successful connection, the call can commence.

On the other hand, when the RAN receives a request to connect a call to a particular WCD, the RAN may page the WCD via an air interface paging channel. When the WCD responds to the page, the RAN may then assign an air interface traffic channel to be used for the call in the WCD's current sector, and the call may commence.

Further, a RAN may facilitate handoff of an ongoing call from one wireless coverage area to another, such as from one sector to another. For example, while a WCD is engaged in a call, the WCD may regularly monitor received signal strength in its current sector and in neighboring sectors, and the WCD may notify the RAN when its received signal strength in a neighboring sector exceeds a comparative threshold level. The RAN may then responsively instruct the WCD to switch over to communicate in that neighboring sector (e.g., to add the neighboring sector to its "active" sector list).

As a general matter, WCDs can be characterized as either "mobile" or "fixed" wireless devices. A core distinction between these types is that mobile wireless devices can and do generally move from place to place, whereas fixed wireless devices usually remain at a known, fixed position. By way of example, mobile wireless devices may include handheld cell phones, wirelessly-equipped PDAs (or handheld computers), and the like, which a user would typically carry from place to place, whereas fixed wireless devices may include wall mounted cell phones, wirelessly-equipped desktop computers, wireless local loop (WLL) devices that provide cellular wireless connectivity for a wired telephone system, and the like, which sit in a given position.

Notwithstanding these differences, however, both mobile and fixed wireless devices typically operate in the same manner as each other with respect to the air interface and RAN. For instance, both types of devices may register with a RAN and then place and receive calls via the RAN. Further, both types of devices may engage in calls that are handed off or transferred from one wireless coverage area to another.

SUMMARY

Generally speaking, each wireless coverage area in a cellular wireless communication system has limited capacity. Depending on the protocol used for communication, this capacity limit can take various forms. In a code division multiple access (CDMA) system, for example, each sector may have a limited number of coded traffic channels for carrying calls over the air interface. Once all of those channels are in use, the sector may be unable to support further calls. Further, as a RAN allows more calls to proceed simultaneously in a given sector, each call may experience increased interference and therefore reduced call quality.

As a result, when a wireless coverage area becomes heavily loaded, a RAN may need to determine whether to allow certain calls to proceed in the coverage area. For example, when the RAN receives a request to connect a call to or from a WCD operating in the coverage area, the RAN may need to decide whether to admit that call into the coverage area or rather whether to block the call from the coverage area. And as another example, when the RAN is faced with a request or desire to hand off a call into the coverage area, the RAN may need to decide whether to do so.

The present invention resolves this issue initially by distinguishing between admission of calls depending on whether the calls involve mobile wireless devices (mobile wireless calls) or fixed wireless devices (fixed wireless calls). In particular, the invention may involve giving higher admission priority to fixed wireless calls than to mobile wireless calls, or giving higher admission priority to mobile wireless calls than to fixed wireless calls.

Giving higher admission priority to fixed wireless calls as compared with mobile wireless calls could provide more consistent, predictable service for fixed wireless calls than for mobile wireless calls. This may, in turn, benefit users of fixed wireless devices, who expect their wireless service to emulate landline telephone service, and therefore to be free from blocks, drops and interference that might arise from overloading in their wireless coverage area. On the other hand, there may be reason in certain situations to give higher admission priority to calls involving mobile wireless devices than to calls involving fixed wireless devices.

Beyond distinguishing between admission of fixed wireless calls and admission of mobile wireless calls, the invention may also involve prioritizing call admission on other grounds, such as the type of bearer traffic carried by the calls. For instance, the invention may involve giving higher priority to admission of voice calls than to admission of fax or data calls, and giving higher priority to fax calls than to data calls. Prioritizing based on the type of bearer traffic carried by calls may similarly cater to user expectations. For instance, users may expect that voice calls are more likely than data calls to proceed without interruption or delay.

An exemplary embodiment of the invention may thus take the form of a method for controlling admission in a wireless coverage area. The method may involve (i) monitoring air interface load in the wireless coverage area and (ii) detecting that the air interface load reaches a first threshold level, and responsively beginning to apply a first admission rule that differentiates between admission of mobile wireless calls in the wireless coverage area and admission of fixed wireless calls in the wireless coverage area. The method would preferably be carried out in a RAN that provides the wireless coverage area, or in a system that controls the RAN. For instance, the method can be carried out by a BSC, an MSC, a combination BSC/MSC, or one or more other RAN entities.

The wireless coverage area as to which the invention applies can be a cell, a sector, or some other area in which a RAN provides wireless communication service, whether the area is contiguous or non-contiguous. The air interface load can then be a measure of how much of the wireless coverage area's air interface capacity is currently in use. For instance, the load can be a measure of Erlangs. Alternatively, the air interface load can take some other form.

In accordance with the exemplary embodiment, the first admission rule that differentiates between admission of mobile wireless calls in the wireless coverage area and admission of fixed wireless calls in the wireless coverage area can take various forms. For instance, the rule can involve allowing admission of fixed wireless calls into the wireless coverage area but blocking admission of mobile wireless calls into the wireless coverage area, or it can involve allowing admission of mobile wireless calls into the wireless coverage area but blocking admission of fixed wireless calls into the wireless coverage area.

Alternatively, the first admission rule can involve allowing a given type of admission of fixed wireless calls into the wireless coverage area but blocking the given type of admission of mobile wireless calls into the wireless coverage area, or allowing a given type of admission of mobile wireless calls into the wireless coverage area but blocking the given type of admission of fixed wireless calls into the wireless coverage area. The given type of admission could be new call establishment (e.g., originations and/or terminations) or handoffs, for instance.

In a further respect, the invention may involve detecting that the air interface load of the wireless coverage area reaches a second threshold level, and responsively beginning to apply a second admission rule that differentiates between admission of calls based on bearer type. For instance, the second admission rule may differentiate between admission of calls based on whether the calls are fax calls, data calls or voice calls, such prioritizing admission of one type of call versus admission of another type of call.

In this regard, the function of detecting that the air interface load of the wireless coverage area reaches the first threshold level can occur before the function of detecting that the air interface load of the wireless coverage area reaches the second threshold level. (For instance, the first threshold level can be lower than the second threshold level.) In that case, the function of beginning to apply the second admission rule can involve beginning to apply the second admission rule to calls that the first admission rule would admit into the wireless coverage area. That is, a call would first need to be allowed by the first admission rule (distinguishing on grounds of fixed versus mobile) and then by the second admission rule (distinguishing on grounds of bearer type).

Alternatively, the function of detecting that the air interface load of the wireless coverage area reaches the second threshold level can occur before the function of detecting that the air interface load of the wireless coverage area reaches the first threshold level. (For instance, the first threshold can be higher than the second threshold.) In that case, the function of beginning to apply the first admission rule can involve beginning to apply the first admission rule to calls that the second admission rule would admit into the wireless coverage area. That is, a call would first need to be allowed by the second admission rule and then by the first admission rule.

In another respect, an exemplary embodiment of the invention may take the form of a wireless admission system. The system may include a base station, a load-monitor, and an admission-controller, which are functional entities that could be integrated together in various ways if desired. The base station would radiate to provide a wireless coverage area in which one or more wireless communication devices can wirelessly communicate with the base station, and the load-monitor would operate to monitor air interface load in the wireless coverage area.

The admission-controller, in turn, would have two modes of operation. In a first mode, the admission-controller would decide whether to allow or block admission of calls into the wireless coverage area regardless of whether the calls are mobile wireless calls or fixed wireless calls (i.e., without distinguishing between the mobile or fixed nature of the calls). In a second mode, the admission-controller would decide whether to allow or block admission of calls into the wireless coverage area based at least in part on whether the calls are mobile wireless calls or fixed wireless calls. In accordance with the exemplary embodiment, the admission-controller would normally operate in the first mode but would operate in the second mode when the air interface load exceeds a first threshold level.

Further, in the second mode, the admission-controller may also decide whether to allow or block admission of calls into the wireless coverage area based at least in part on bearer type of the calls. Thus, when the air interface load exceeds the first threshold level, the admission-controller may decide whether to allow or block admission of calls into the wireless area based at least in part on both the mobile/fixed nature of the calls and the bearer type of the calls. For instance, the admission-controller may allow certain types of calls only if the calls are fixed wireless voice calls. Other examples are possible as well.

Alternatively, the admission-controller may have a third mode in which it would decide whether to allow or block admission of calls into the wireless coverage area based at least in part on both the mobile/fixed nature of the calls and the bearer type of the calls. The admission controller may then normally operate in the first mode, may operate in the second mode when the air interface load exceeds a first threshold level, and may operate in the third mode when the air interface load exceeds a second threshold level (e.g., greater than the first threshold level).

These as well as other aspects and advantages of the invention will become apparent to those of ordinary skill in the art by reading the following detailed description with reference where appropriate to the accompanying drawings.

DETAILED DESCRIPTION OF AN EXEMPLARY EMBODIMENT

Figure 1:
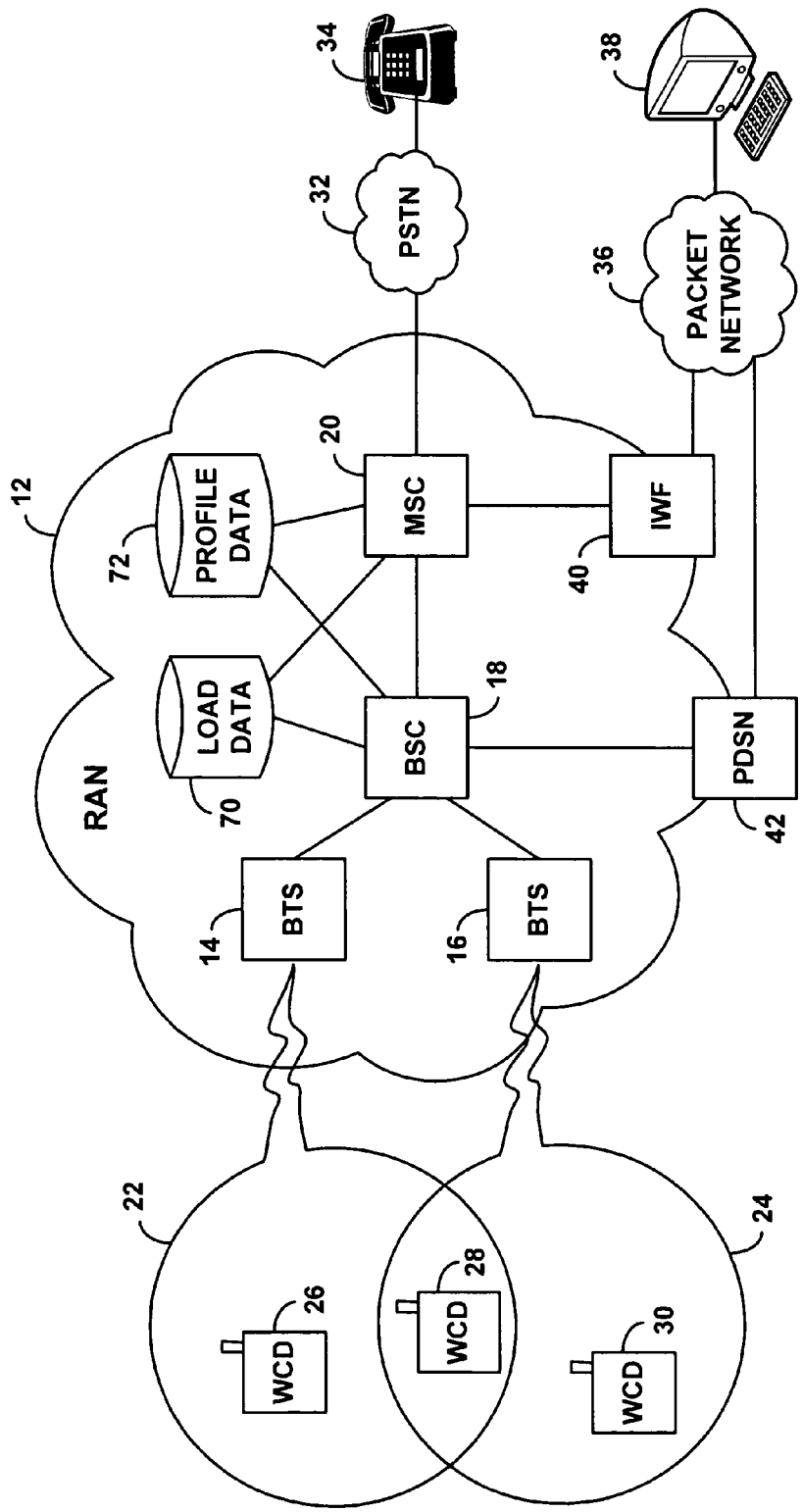
FIG. 1 is a block diagram of a cellular wireless communication system arranged to carry out an exemplary embodiment of the invention.

Referring to the drawings, FIG. 1 is a block diagram of an example cellular wireless communication system arranged to carry out an embodiment of the invention. As shown, the example system includes at its core a radio access network (RAN) 12 comprising two base transceiver stations (BTSs) 14, 16, one base station controller (BSC) 18, and one mobile switching center (MSC) 20. As noted above, these RAN entities are functional in nature and can be integrated and distributed in various ways. Further, a RAN could alternatively include more or fewer of the entities shown or could include other entities or take some other form altogether.

Conventionally, each BTS may comprise an antenna tower (not shown) that radiates to define one or more wireless coverage areas in which wireless communication devices (WCDs) can operate. By way of example, FIG. 1 shows BTS 14 radiating to define a first wireless coverage area 22, and BTS 16 radiating to define a second wireless coverage area 24. Each wireless coverage area may be a cell sector defined by the BTS. Alternatively, each wireless coverage area may take some other form. Further, although FIG. 1 shows each cell sector emanating from a respective BTS, the sectors could alternatively emanate from a common BTS.

FIG. 1 also depicts three example WCDs 26, 28, 30, throughout the coverage areas 22, 24. In particular, WCD 26 is shown positioned within coverage area 22, WCD 30 is shown positioned within coverage area 24, and WCD 28 is shown positioned in an area of overlap between coverage areas 22, 24. At these positions, WCD 26 would be able to communicate with the RAN via coverage area 22, WCD 28 would be able to communicate with the RAN via coverage area 22 or 24, and WCD 30 would be able to communicate with the RAN via coverage area 24.

Air interface communications between each WCD and the RAN can follow various protocols. For instance, the air interface communications can be analog communications compliant with the AMPS protocol or can be digital communications compliant with the CDMA, TDMA, GSM or 802.11 protocols. For illustration, this description will assume the communications are compliant with CDMA, as defined by TIA/EIA/IS-95 and IS-2000 (CDMA2000), which are well known to those of ordinary skill in the art.

In CDMA, the air interface communications in each sector are modulated with a unique code (pseudorandom noise offset, or PN offset) specific to the sector, so as to distinguish communications in one sector from communications in another sector. Further, within a given sector, communications by a given WCD are modulated with a unique Walsh code, so as to distinguish communications by one WCD from communications by another WCD. Under accepted CDMA procedures, each sector has a limited number of Walsh codes and therefore a limited number of traffic channels available for use by WCDs. Certain Walsh codes in each sector are also reserved for use to define common control channels, including an access channel, a pilot channel, a sync channel and a paging channel, to support various air interface operations.

As further shown in FIG. 1, MSC 20 provides connectivity with the PSTN 32, which may in turn provide connectivity with a remote telephone device 34. Under conventional procedures, a WCD such as WCD 26 for instance may then originate a call to that remote device by sending an origination message via the access channel in its coverage area 22, and via its BTS 14 and BSC 18 to the MSC 20. The MSC 20 would then set up the call via PSTN 32 to device 34. Further, the MSC 20 would instruct BSC 18 to assign a traffic channel for use by WCD 26 in sector 22. Thus, when the called party answers, WCD 26 can communicate with device 34 via its assigned traffic channel in sector 22, and via RAN 12 and PSTN 32.

Similarly, if MSC 20 receives a request from PSTN to set up a call to a WCD such as WCD 26, MSC 20 may cause BSC 18 to broadcast an air interface page message announcing the call. Upon receipt of the page message, WCD 26 may then respond with a page response message to MSC 20 via sector 26, and MSC 20 may responsively instruct BSC 18 to assign a traffic channel for use by WCD 26 in sector 26, so that the call can then commence.

As further shown, MSC 20 and BSC 18 may also be coupled through respective gateways with a packet-switched network 36, which may provide connectivity with a remote computing device 38 such as a host network server or an IP-telephony station. In particular, in the arrangement shown, MSC 20 is coupled with an interworking function (IWF) 40, which provides connectivity with the packet network 36, and BSC 18 is coupled with a packet data serving node (PDSN)

42, which also provides connectivity with the packet network 36. Packet network 36 may be a private packet network, such as a wireless carrier's core network and/or a public packet network such as the Internet.

With this arrangement, a WCD such as WCD 26 may also engage in calls in the form of packet-data sessions with remote computing device 38. To engage in a data session via MSC 20 and IWF 40, for instance, WCD 26 may send a data origination message to the MSC 20, and MSC 20 may responsively set up a call with IWF 40 and instruct BSC 18 to assign a traffic channel for use by WCD 26 in its current sector 22. IWF 40 may then function to interface between circuit-switched data communications with the WCD and packet-switched communications on network 36.

Alternatively, to engage in a data session via BSC 18 and PDSN 42, WCD 26 may send packet-data origination message to MSC 20, and MSC 20 may responsively pass the message to BSC 18 for handling. BSC 18 may then assign a traffic channel for use by WCD 26 in its current sector, and BSC 18 may pass the origination request along to a packet control function (PCF, not shown), which may in turn signal to PDSN 42. PDSN 42 and WCD 26 may then negotiate to establish a data link layer connection, such as a point-to-point protocol (PPP) session, and PDSN 42 or a Mobile-IP home agent (not shown) may then assign an IP address for use by WCD 26. WCD 26 may then begin engaging in packet-data communications on network 36.

Conventionally, if packet data does not flow to or from a WCD for a specified period of time in this arrangement, the PCF may instruct the BSC to release the traffic channel that had been assigned to the WCD, thus rendering the WCD "dormant." Thereafter, if the WCD seeks to send packet data, the WCD would send a new origination message into the RAN 12 in order to re-acquire a traffic channel, thereby effectively placing a new "call," after which it can then send the packet data. Similarly, if the PCF receives packet data destined for the IP address of the WCD, the PCF can signal to the BSC, which may cause the MSC to page the WCD. As in the call setup procedure outlined above, when the WCD then sends a page response, the BSC may again assign a traffic channel for use by the WCD in its current sector, and the PCF may then send the packet data through to the WCD.

As further noted above, a RAN conventionally supports handoff functionality, to allow an ongoing call to be shifted from one wireless coverage area to another. Generally speaking, handoff would be possible in a scenario where a WCD is physically located within the range of at least two coverage areas, so that it could in theory communicate with the RAN via either coverage area. For instance, WCD 28 in FIG. 1 is shown in an area of overlap between coverage areas 22 and 24, and so WCD 28 could theoretically operate in either coverage area.

Handoff can be WCD-originated or RAN-originated. In either case, a WCD such as WCD 28 may regularly monitor its received signal strength (or another value such as signal-to-noise ratio or $E_c/I_o$ for instance) in its current coverage area (the coverage area in which it has an assigned traffic channel for the call in which it is engaging) and in each of its neighboring coverage areas. To accomplish this, the WCD may receive from the RAN a list of neighboring coverage areas to monitor, and the WCD may tune to each one and measure received signal strength.

In a WCD-originated handoff scenario, the WCD may then decide that the received signal strength exceeds a comparative threshold and may responsively signal to the BSC to request handoff. If the BSC approves of the handoff, the BSC may then direct the WCD to carry out the handoff (e.g., sending the WCD a handoff direction message (HDM), for instance) and assigning the WCD to use a particular traffic channel in the new coverage area. In a network-originated handoff scenario, on the other hand, the WCD may regularly report its received signal strength measurements back to the BSC, and the BSC may decide on the basis of those measurements when to orchestrate a handoff.

Other handoff triggering mechanisms are possible as well. For instance, a WCD and/or RAN may use geographic position, round trip signal delay, and/or a combination of these and other mechanisms to trigger a handoff from one coverage area to another.

Figure 2:
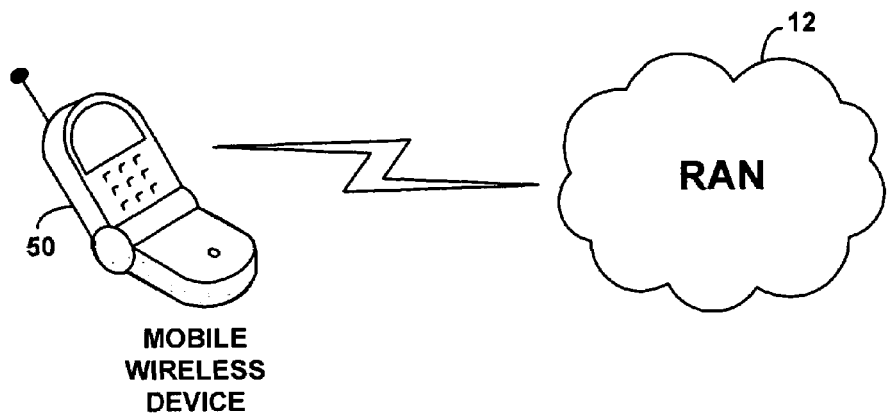
FIG. 2 is a diagram depicting a mobile wireless device operable within the exemplary embodiment.
Figure 3:
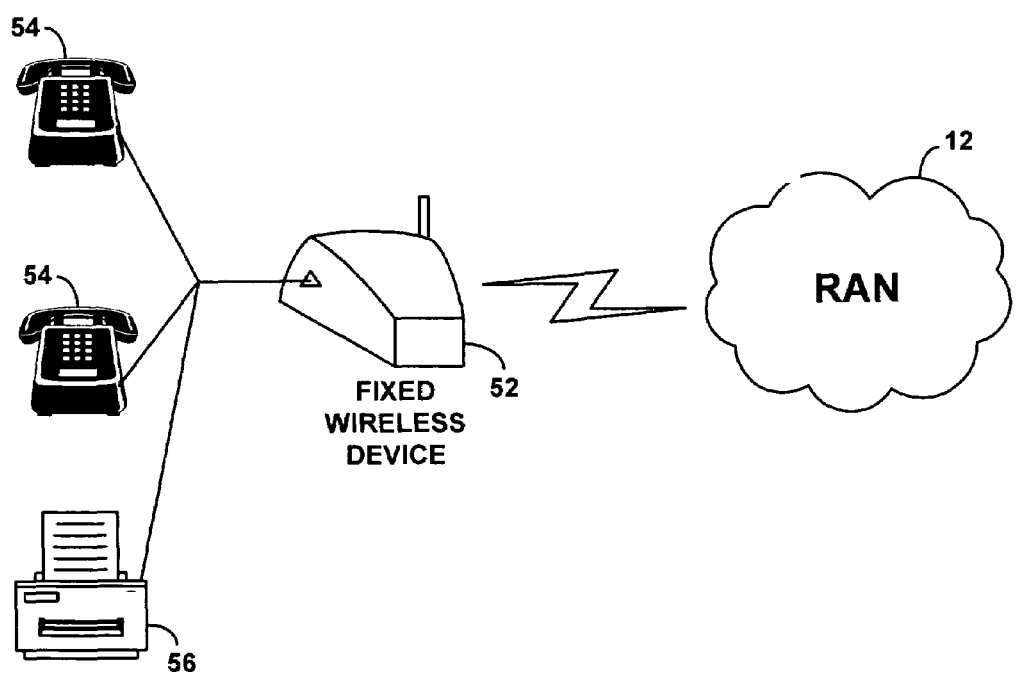
FIG. 3 is a diagram depicting a fixed wireless device operable within the exemplary embodiment.

Each WCD shown in FIG. 1 can be either a mobile wireless device or a fixed wireless device and can take various forms. FIGS. 2 and 3 depict examples of mobile and fixed wireless devices. As shown in FIG. 2, for instance, an example mobile wireless device may take the form of a 3G PCS cell phone 50, which is conventionally carried from place to place by a person or machine (e.g., automobile). As shown in FIG. 3, on the other hand, an example fixed wireless device may take the form of a wireless local loop (WLL) hub 52 that interfaces between a cellular wireless communication system and a local wired telephone network in a house or office for instance. The local telephone network may then provide landline or wireless connectivity with various telephone devices, such as POTS telephones 54 and fax machines 56 for instance. Other examples of fixed and mobile wireless devices, such as those described in the background section above, are possible as well.

Figure 4:
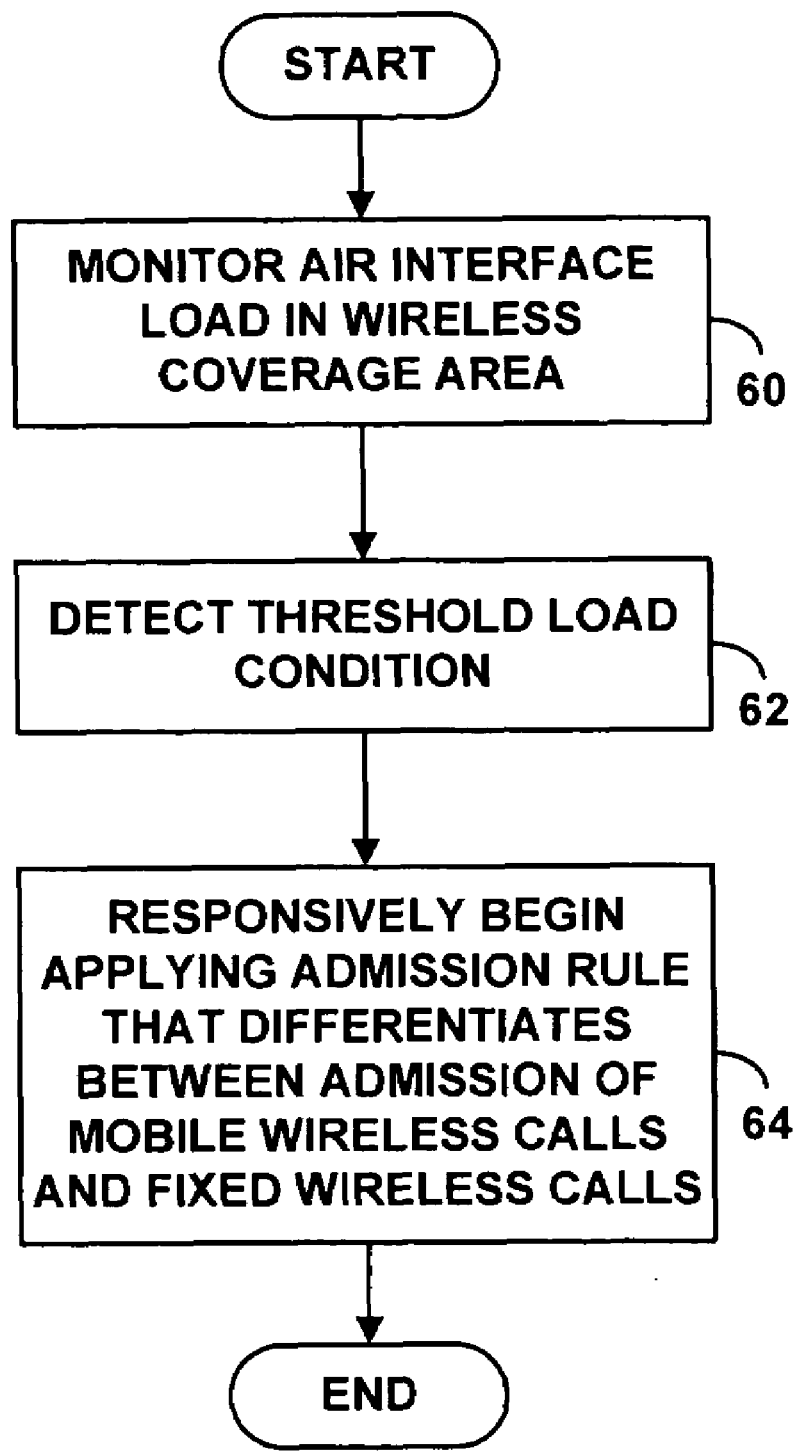
FIG. 4 is a generalized flow chart depicting functions carried out in accordance with the exemplary embodiment.

As noted above, each wireless coverage area in a cellular wireless communication system will typically have limited capacity, and so a RAN may be arranged to selectively admit certain calls into a given coverage area but to block other calls from the coverage area. In accordance with the exemplary embodiment, the RAN will make its admission decisions based at least upon whether the calls are fixed wireless calls or mobile wireless calls. FIG. 4 depicts this process generally.

As shown in FIG. 4, at block 60, the RAN will first monitor the air interface load in the wireless coverage area. At block 62, the RAN will then detect that the air interface load has reached a threshold level. And at block 64, the RAN will responsively begin applying an admission rule that differentiates between admission of mobile wireless calls in the wireless coverage area and admission of fixed wireless calls in the wireless coverage area.

Although these steps are illustrated linearly in FIG. 4, it should be understood that the load-monitoring function will preferably be carried out in parallel with the admission-control function. More particularly, in a preferred embodiment, one or more entities of the RAN will continuously (e.g., periodically) conduct a load-monitoring process to maintain a record of the load in each coverage area served by the RAN, and one or more entities of the RAN may conduct an admission-control process that refers to that load data to determine whether to admit a given call into a given wireless coverage area.

A given entity or group of entities could carry out both the load-monitoring process and the admission-control process, or separate entities can carry out the respective processes. In the exemplary arrangement shown in FIG. 1, for instance, BSC 18 and/or MSC 20 may carry out the processes.

To carry out the invention in the exemplary embodiment, BSC 18 and MSC 20 may include or have access to a load-data store 70, which will hold data indicating the load per coverage area. By way of example, the load-data store may take the form of a table of data having a record for each wireless coverage area served by the RAN and indicating in each record what the current (or last determined) air interface load is in the coverage area. Further, each record may also include one or more flags (e.g., Boolean parameters) indicating whether the current air interface load in the coverage area exceeds a particular threshold load level. For instance, each record may have a flag for a first threshold load level, which would be set when the current load in the coverage area exceeds the first threshold load level, and a flag for a second threshold level, which would be set when the load in the coverage area exceeds the second threshold load level.

In addition, BSC 18 and MSC 20 may include or have access to a profile-data store 72, which will hold WCD profile data indicating, per WCD, whether the WCD is a fixed wireless device or a mobile wireless device, and perhaps further indicate what type of bearer traffic the WCD communicates (e.g., voice data, fax data, etc.) Profile-data store 72 could be a visitor location register (VLR), which obtains a WCD's profile data from a home location register (HLR) when the WCD registers in the RAN, or profile-data store 72 could take other forms.

A wireless carrier could provision the profile record for a given WCD to indicate WCD characteristics such as whether the WCD is mobile or fixed, and perhaps to indicate what type of bearer traffic the WCD communicates. The "mobile" or "fixed" characterization of the WCD would ideally be based on whether the WCD is expected to move from place to place. Thus, for instance, the wireless carrier would most sensibly characterize a WCD as a mobile wireless device if the WCD is a handheld cell phone, whereas the wireless carrier would most sensibly characterize a WCD as a fixed wireless device if the WCD is a wall-phone or a WLL hub.

The characterization of what sort of bearer traffic the WCD communicates can be based on what type of device the WCD is. For instance, if the WCD is a wireless fax machine, then the characterization could be that the WCD communicates fax data. On the other hand, if the WCD is a packet-data capable cell phone, the characterization could be that the cell WCD communicates voice and packet-data. Other examples are possible as well.

Figure 5:
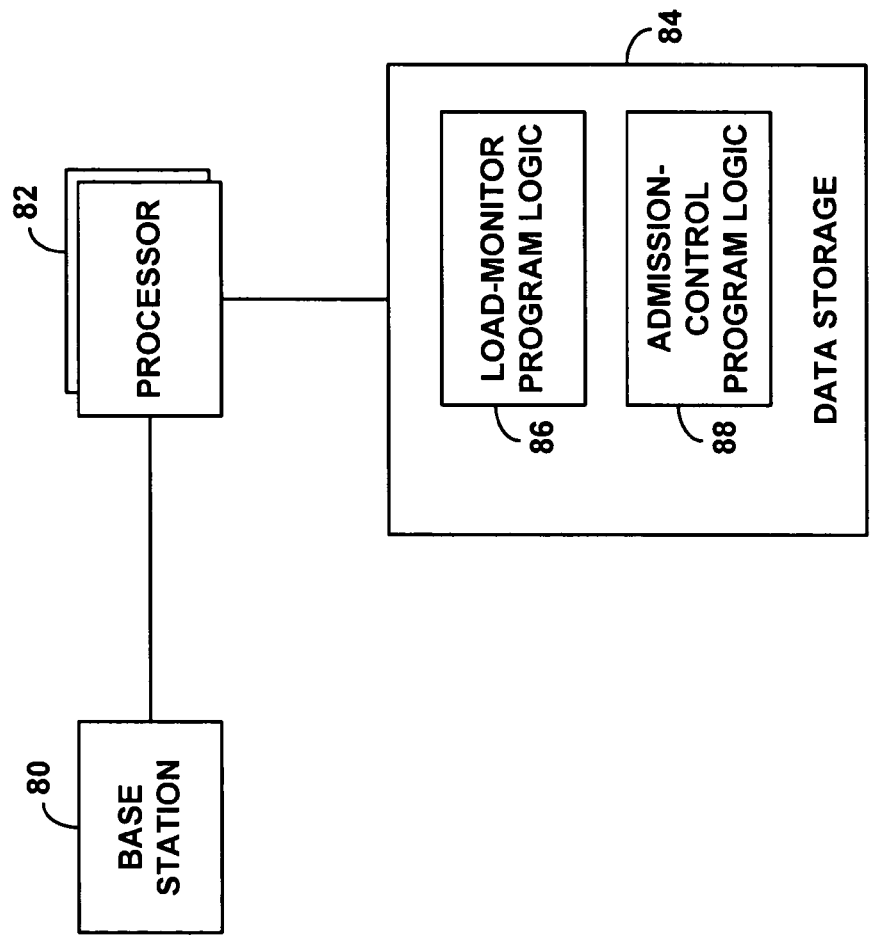
FIG. 5 is a block diagram depicting functional components of a wireless admission control system in accordance with the exemplary embodiment.

FIG. 5 is next a block diagram depicting functional components of a wireless admission control system. As shown, the system would preferably include a base station (e.g., BTS) 80, a processor (e.g., one or more general purpose and/or special purpose processors) 82, and data storage (e.g., volatile and/or nonvolatile storage) 84. In the preferred embodiment, the base station radiates to provide a wireless coverage area in which one or more WCDs can wirelessly communicate with the base station. The processor and data storage may then reside in or be interconnected with a BSC such as BSC 18 and an MSC such as MSC 20.

Data storage 84, which may be integrated with load-data store 70 and/or profile-data store 72, preferably holds program instructions that are executable by the processor 82 to carry out various functions described herein. Alternatively, some or all of the functions could be implemented by any combination of software, firmware and/or hardware.

As shown in FIG. 5, for instance, data storage 84 may contain load-monitor program logic 86 and admission-control program logic 88. The load-monitor logic 86 is executable by processor 82 to monitor the air interface load in each wireless coverage area of the RAN and to record the load in the data storage 84, such as in load-data store 70. Further, the load-monitor logic 86 may be arranged to set flags in the load-data records to indicate whether the current load a coverage area exceeds one or more designated threshold load levels.

Load-monitor logic 86 can cause processor 82 to monitor load in various ways, with various measures of load. In a preferred embodiment, for instance, the load-monitor logic can measure load per coverage area in Erlangs. Alternatively, the load-monitor logic can measure load per coverage area in other ways now known or later developed, such as the extent of available data bandwidth (e.g., bits per second) currently allocated, the extent of available power consumed, or the like. RAN entities, such as an MSC or BSC, normally track the load per coverage areas for other reasons, so this data would not be difficult to maintain in practice. The load-monitor logic could include a separate thread to monitor load in each coverage area of the RAN and to update the load-data records accordingly. Further, the load-monitor logic could be provisioned with load threshold data indicating one or more load-thresholds. Each time the processor 82 updates the load measure in a given coverage area, the processor 82 could then set or clear one or more flags to indicate whether the load exceeds one or more designated load-thresholds, such as a certain number of Erlangs for instance.

The admission-control logic 88 is then executable by the processor 82 to determine whether to allow calls to proceed in various wireless coverage areas. As such, the admission-control logic could be executed at the MSC 20 whenever the MSC 20 receives a request (e.g., origination request, page response, etc.) to initiate a call to or from a WCD operating in a given coverage area. Further, the admission-control logic could be executed at the BSC 18 whenever the BSC 18 is determining whether to allow a handoff of a call into a given wireless coverage area.

The admission-control logic 88 preferably has multiple modes of operation and, when faced with the issue of whether to admit a given call in a given wireless coverage area, will operate in a mode that depends on the level of air interface load in the wireless coverage area. For instance, the admission-control logic 88 may have a first mode in which it normally operates, a second mode in which it operates when the load in the coverage area at issue exceeds a first threshold level, and a third mode in which it operates when the load in the coverage area at issue exceeds a second threshold level.

In the first, normal mode of operation, the admission-control logic may be arranged to decide whether to allow or block admission of calls without regard to whether the calls involve fixed wireless devices or mobile wireless devices. Thus, the admission-control logic may simply allow all calls, block or calls, or make an admission on some other basis, not including a consideration of the fixed or mobile nature of the WCD involved in the call. For instance, when the MSC 20 receives a call origination request from a WCD seeking to initiate a call in a given wireless coverage area or the BSC 18 is considering whether to hand off a call involving the WCD to the given coverage area, the admission-control logic may refer to the load-data store 70 to determine whether the air interface load in that coverage area exceeds a threshold. If it does not exceed a threshold, then the admission-control logic may operate normally in the first mode.

In the second mode of operation, the admission-control logic may be arranged to decide whether to allow or block admission of calls based at least in part on whether the calls involve fixed wireless devices or mobile wireless devices. The admission-control logic may determine whether a given call involves a fixed wireless device or a mobile wireless device in various ways. For instance, the admission-control logic may refer to the profile-data store 72 and read the record for the WCD involved in the call (as indicated by a WCD-ID such as a MIN, MSID, NAI or other identifier). Alternatively, the admission-control logic may receive an indication of device type (mobile or fixed) from the WCD during call initiation signaling (such as in an origination request), if the WCD is configured to provide such an indication.

Thus, for example, when the MSC 20 receives an origination request from a given WCD seeking to originate a call in a given wireless coverage area or the BSC 18 is considering whether to hand off a call involving the WCD to the given coverage area, the admission-control logic may refer to the load-data store and thereby determine that the load in the coverage area exceeds the first threshold level. Therefore, the admission-control logic may operate in the second mode. In turn, the admission-control logic may determine whether the WCD is a mobile wireless device or a fixed wireless device, and the admission-control logic may base its admission decision at least in part whether the WCD is a mobile wireless device or a fixed wireless device. For instance, if the WCD is a fixed wireless device, the admission-control logic may be arranged to allow the call, whereas if the WCD is a mobile wireless device, the admission-control logic may be arranged to block the call.

In the third mode of operation, the admission-control logic may be arranged to decide whether to allow or block admission of calls based at least in part on (i) whether the calls involve mobile wireless devices or fixed wireless devices and (ii) the type of bearer traffic carried by the calls (i.e., the "bearer type" of the calls). As noted above, the admission-control logic may operate in this mode when the air interface load in the wireless coverage area exceeds a second threshold level. The second threshold level can be the same as the first threshold level, in which case the admission-control logic would switch to this mode from the first mode. Alternatively, the second threshold level can be greater (or otherwise different) than the first threshold level, in which case the admission-control logic could switch from the first mode to the second mode and then to the third mode.

The admission-control logic can apply the processes described above to take the mobile/fixed nature of a WCD into consideration when making an admission decision. In order to based the admission decision on the bearer type of the call as well, the admission-control logic will need to determine the bearer type of the call, which it can do in various ways.

In one embodiment, for example, the admission-control logic can refer to the profile-data store 72 and read the record for the WCD at issue in order to determine what type of bearer traffic the WCD communicates. If it is clear from that record that the WCD communicates a particular type of bearer traffic only, then the admission-control logic may base its admission decision on that bearer type. In another embodiment, the admission-control logic can determine the bearer type through signaling during call initiation. For instance, when the WCD initiates the call (e.g., in an origination message), the WCD, if suitably equipped, could send the RAN an indication of what type of bearer traffic the call will carry. In still another embodiment, during an ongoing call (when faced with a handoff decision, for instance), the admission control logic can evaluate the bearer traffic itself to determine what type it is. (Technology for detecting call type is available to those of ordinary skill in the art. For instance, see the web page at www.commetrex.com/products/algorithms/telephony/callclassifier.html for a discussion of an example product, the "call classifier.")

Given the bearer type of the call and the mobile/fixed nature of the WCD, the admission-control logic can then decide whether to allow or block the call. For instance, the admission-control logic can perform two stages of analysis. In a first stage of analysis, the admission-control logic can decide based on the mobile/fixed nature of the WCD whether to allow or block the call. If the admission-control logic thereby decides to allow the call, then the admission-control logic can decide based on the bearer type whether to allow or block the call. By way of example, the admission-control logic may allow voice calls but block fax or data calls, or the admission-control logic may allow voice and fax calls but block data calls. Other examples are possible as well.

Figure 6:
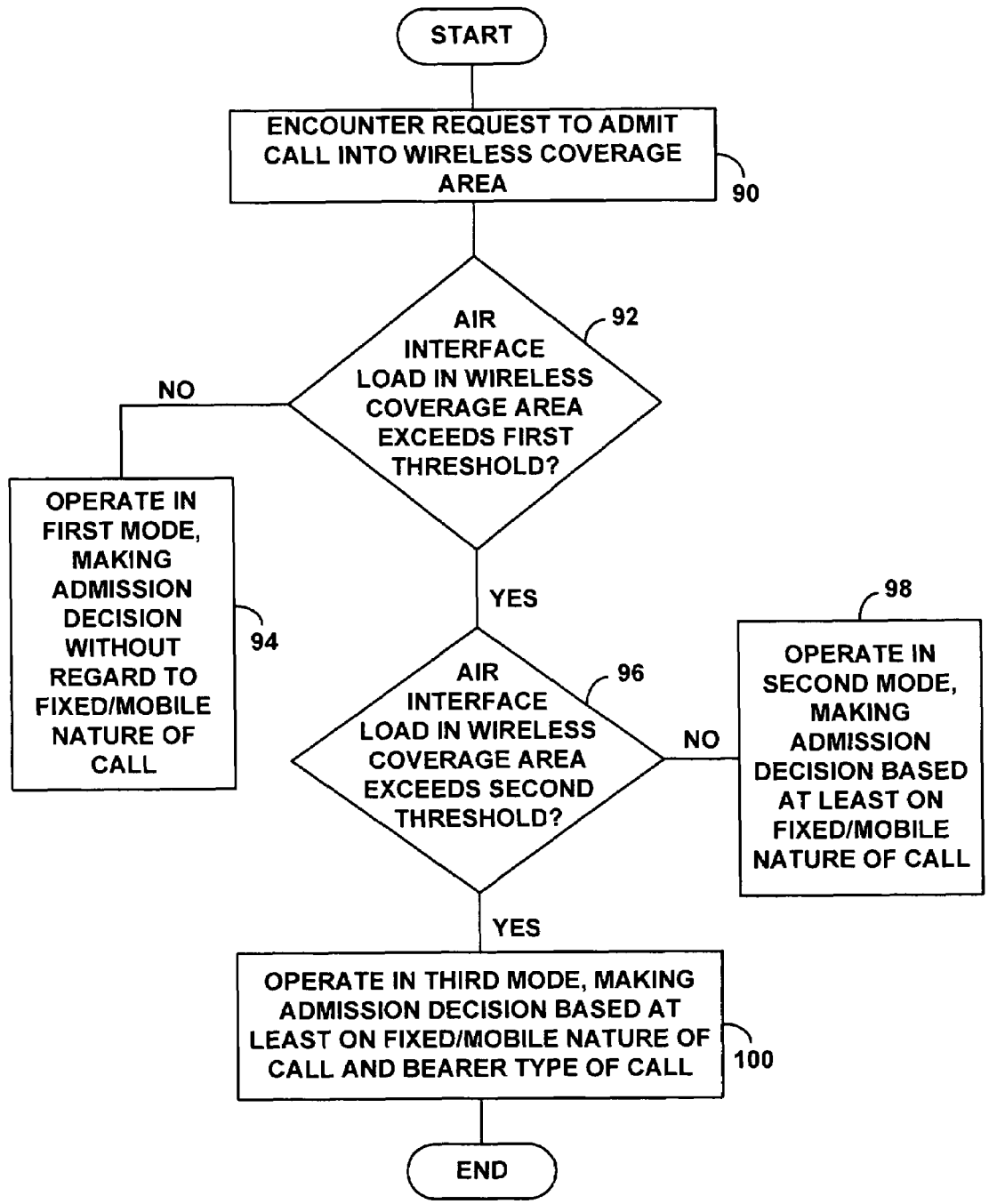
FIG. 6 is a flow chart depicting tri-mode operation of an admission controller according to the exemplary embodiment.

FIG. 6 is a flow chart depicting the tri-mode operation of an admission-controller in accordance with the exemplary embodiment. As shown in FIG. 6, at block 90, the admission-controller encounters a request (self-generated, or received from another entity) to admit a call into a given wireless coverage area. At block 92, the admission-controller then refers to the load-data for that coverage area to determine whether the air interface load in the coverage area exceeds a first threshold. If not, then, at block 94, the admission-controller operates in a first mode in which it makes an admission decision without regard to whether the WCD is a fixed wireless device or a mobile wireless device. On the other hand, if the load exceeds the first threshold, then, at block 96, the admission-controller determines from the load data whether the air interface load in the coverage area exceeds a second threshold. If not, then, at block 98, the admission-controller operates in a second mode in which it makes an admission decision based at least in part on whether the WCD is a fixed wireless device or a mobile wireless device. On the other hand, if the load exceeds the second threshold, then, at block 100, the admission controller operates in a third mode in which it makes an admission decision based at least in part on the fixed/mobile nature of the WCD and further on the bearer type of the call.

Note that when the admission-controller decides to "block" a call from proceeding in a given coverage area, it may altogether prevent the call from proceeding or it may temporarily block the call or shift it to some other coverage area. To block a call from proceeding altogether in a call initiation scenario, the admission-controller may simply refuse to allow the call to be initiated. To block a call from proceeding altogether in a handoff scenario, the admission-controller may refuse to allow the handoff, thus restricting the call to its current coverage area.

To temporarily block a call from proceeding in either scenario, on the other hand, the admission-controller may simply hold the call in a queue and then check back after a certain period of time to see whether the load in the coverage area at issue is such that the admission-controller can operate in a different mode that would allow the call to proceed. Finally, to shift a call to some other coverage area, the admission-controller could send to the WCD a signal (such as a handoff direction message, that causes the WCD to effectively hand off to the other coverage area.

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method of controlling call admission in a wireless coverage area, the method comprising:
monitoring air interface load in the wireless coverage area;
detecting that the air interface load reaches a first threshold level, and
receiving a request to initiate a call to or from a wireless communication device operating in the wireless coverage area and responsively executing admission-control logic for operation in a first mode that allows admission of the call in the wireless coverage area if the wireless communication device is a fixed wireless device, but that blocks admission of the call in the wireless coverage area by holding the call in a queue if the wireless communication device is a mobile wireless device, and that subsequently, based on the air interface load in the wireless coverage area, allows the call in queue to proceed in the wireless coverage area.

2. The method of claim 1, further comprising:
carrying out the monitoring, detecting, receiving and executing functions in a radio access network that provides the wireless coverage area.

3. The method of claim 2, wherein carrying out the monitoring, detecting, receiving and executing functions in a radio access network comprises carrying out one or all of the functions at a base station controller (BSC), mobile switching center (MSC), or combination BSC/MSC.

4. The method of claim 1, wherein the wireless coverage area is a cell sector.

5. The method of claim 1, wherein the air interface load comprises an extent of air interface capacity currently in use.

6. The method of claim 1, further comprising:
detecting that the air interface load reaches a second threshold level, and responsively executing admission-control logic for operation in a second mode in which blocking or allowing calls into the wireless coverage area is based at least in part on a type of bearer traffic carried by the calls.

7. The method of claim 6, wherein the admission-control logic for operation in the second mode differentiates between calls based on whether the calls are fax calls, data calls or voice calls.

8. The method of claim 6, further comprising:
detecting that the air interface load reaches the second threshold level after detecting that the air interface load reaches the first threshold level,
wherein executing the admission-control logic for operation in the second mode comprises executing the admission-control logic for operation in the second mode to a call that the admission-control logic for operation in the first mode would allow in the wireless coverage area.

9. The method of claim 6, further comprising:
detecting that the air interface load reaches the first threshold level after detecting that the air interface load reaches the second threshold level,
wherein executing the admission-control logic for operation in the first mode comprises executing the admission-control logic for operation in the first mode to a call that the admission-control logic for operation in the second mode would allow in the wireless coverage area.

10. A wireless admission system comprising:
a base station radiating to provide a wireless coverage area in which one or more wireless communication devices can wirelessly communicate with the base station;
a load-monitor for monitoring air interface load in the wireless coverage area, and
an admission-controller having (i) a first mode in which the admission-controller decides whether to allow or block admission of calls into the wireless coverage area regardless of whether the calls involve fixed wireless devices or mobile wireless devices, and (ii) a second mode in which the admission-controller decides whether to allow or block admission of calls into the wireless coverage area based at least in part on whether the calls involve mobile wireless devices or fixed wireless devices;
wherein the admission-controller normally operates in the first mode but operates in the second mode when the air interface load exceeds a first threshold level, and
wherein, in the second mode, the admission-controller applies admission-control logic allowing admission of a call in the wireless coverage area if the call is to or from a fixed wireless device, but blocking admission of the call in the wireless coverage area by holding the call in a queue if the call is to or from a mobile wireless device, and subsequently, based on the air interface load in the wireless coverage area, allowing the call in the queue to proceed in the wireless coverage area.

11. The wireless admission system of claim 10, wherein the wireless coverage area is a cell sector.

12. The wireless admission system of claim 10, wherein:
the admission-controller comprises executable program instructions; and
the load-monitor comprises executable program instructions.

13. The wireless admission system of claim 10, wherein the air interface load comprises an extent of air interface capacity currently in use.

14. The wireless admission system of claim 10, wherein, in the second mode, the admission-controller decides whether to allow or block admission of calls into the wireless coverage area based at least in part on (i) whether the calls are to or from mobile wireless devices or fixed wireless devices, and (ii) bearer type of the calls.

15. The wireless admission system of claim 14, wherein, in the second mode, the admission-controller decides whether to allow or block admission of calls into the wireless coverage area based at least in part on whether the calls are voice calls, fax calls or data calls.

16. The wireless admission system of claim 10,
wherein the admission-controller has a third mode in which the admission-controller decides whether to allow or block admission of calls into the wireless coverage area based at least in part on (i) whether the calls are to or from mobile wireless devices or fixed wireless devices, and (ii) bearer type of the calls;
wherein the admission-controller normally operates in the first mode, operates in the second mode when the air interface load exceeds the first threshold level, and operates in the third mode when the air interface load exceeds a second threshold level.

17. The wireless admission system of claim 16, wherein the second threshold level is greater than the first threshold level.

18. The method of claim 1, further comprising:
receiving at the admission-control logic an indication of whether the wireless communication device is the fixed wireless device or the mobile wireless device.

19. The method of claim 1, wherein the received indication is within an origination request from the wireless communication device.

20. The method of claim 1, wherein the air interface load is a measure of Erlangs.

21. The method of claim 1, wherein the air interface load comprises an extent of available power consumed.

* * * * *